YIELD AS FUNCTION OF SPACE VELOCITY

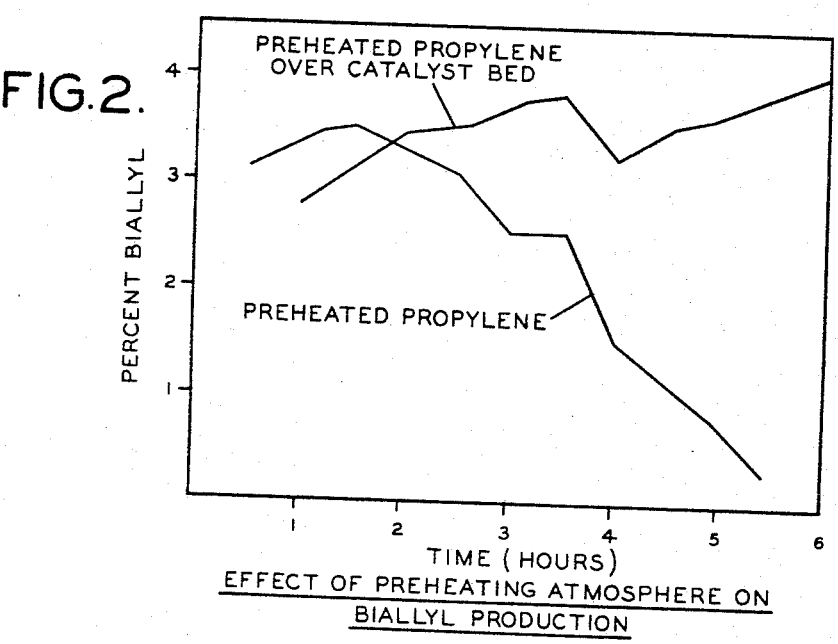
FIG.2. EFFECT OF PREHEATING ATMOSPHERE ON BIALLYL PRODUCTION
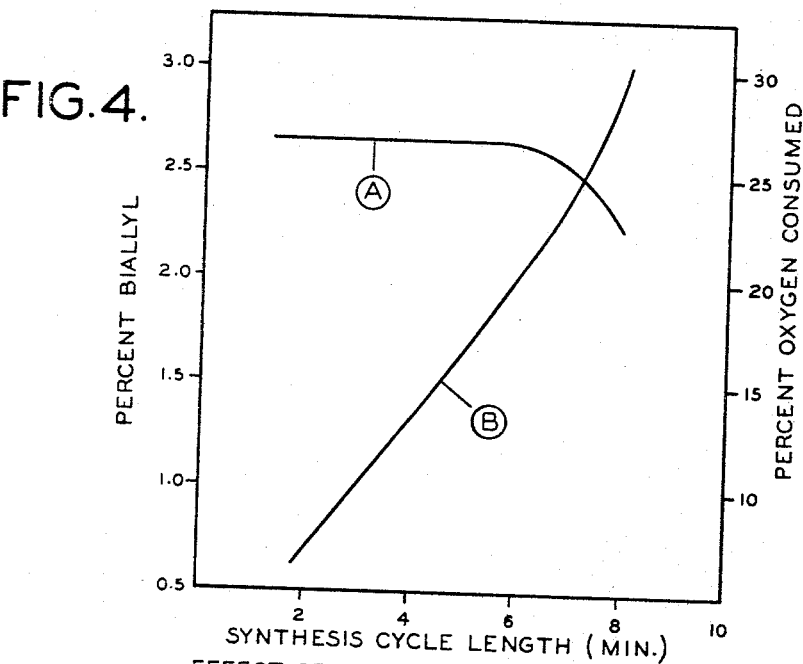
FIG.4. EFFECT OF CYCLE LENGTH ON BIALLYL PRODUCTION AND PERCENT OXYGEN CONSUMED
INVENTORS:
WILLIAM P. MOORE, JR.
JACK W. MOSIER
BY
ATTORNEY

ATTACK OF PROPYLENE
AS FUNCTION OF SPACE VELOCITY

EFFICIENCY AS FUNCTION OF SPACE VELOCITY

INVENTORS:
WILLIAM P. MOORE, JR.
JACK W. MOSIER
BY
ATTORNEY

United States Patent Office 3,435,089
Patented Mar. 25, 1969

3,435,089
DEHYDRODIMERIZATION PROCESS AND CATALYST THEREFOR
William P. Moore, Jr., Chester, and Jack W. Mosier, Petersburg, Va., assignors to Allied Chemical Corporation, New York, N.Y., a corporation of New York
Filed Oct. 21, 1965, Ser. No. 499,287
Int. Cl. C07c *11/12, 3/20;* B01j *11/32*
U.S. Cl. 260—680                     11 Claims

ABSTRACT OF THE DISCLOSURE

Biallyl is produced by contacting propylene with PbO supported on an inert carrier having a surface area no greater than about 1 meter$^2$ per gram. The reaction is conducted in the absence of molecular oxygen at a temperature of between about 320° C. and about 700° C. until the PbO is reduced to Pb$_2$O. The Pb$_2$O is subsequently converted back to PbO by heating in contact with a molecular oxygen-containing gas. The biallyl can be readily separated in high yield and purity from unreacted propylene which can be recycled.

---

This invention relates to the coupling of propylene in a dehydrodimerization process and to novel catalysts therefor. More particularly, it relates to the coupling of propylene by removal of a hydrogen atom from the methyl group of the compound and linking of the free radicals in the presence of a highly selective catalyst.

Dehydrodimerization of certain compounds is known to occur in the presence of hydrogen peroxide, an expensive compound, with low yield of the dehydrodimerized product due to the production of considerable amounts of by-products. Other known methods generally require the use of expensive raw materials and provide low yields. An improved dehydrodimerization process was devised in copending U.S. application S.N. 445,795, filed Apr. 5, 1965, whereby yields and reaction efficiency were improved by employing catalysts of high surface area in a direct oxidative coupling reaction.

We have now devised a method for the production of biallyl and similar compounds by an oxidative coupling reaction which is an improvement over the process of S.N. 445,795. The instant improvement is based on (A) the discovery that if the reaction is conducted in a cyclically operated, regenerative reactor containing a specific lead oxide catalyst with operation conditions controlled so that the lead oxide is reduced no further than the reactive suboxide (Pb$_2$O), the following advantages are received:

(1) Higher reaction efficiency
(2) Relatively higher biallyl concentration in exit gas
(3) Use of air as oxygen supply for regeneration
(4) No expensive additives
(5) Use of a fundamental and low cost raw material
(6) The elimination of pyrolitic reactions by preheating the propylene over lead oxide
(7) Direct recovery of heat and (B) the discovery that if the lead oxide catalyst employed is of a certain type, specifically, having a low surface area, the following advantages are received:

(1) Higher attack on propylene
(2) Higher conversion of propylene to desired product
(3) Efficient and complete regeneration of catalyst to its original state of oxidation for reuse in the process.

The present invention will be readily understood from the following discussion which will detail the invention in two parts (A) the novel catalyst and (B) the novel synthesis of biallyl employing said catalyst.

(A) THE CATALYST

For maximum effectiveness in a direct oxidation reaction, as disclosed in S.N. 445,795, high-surface lead oxide catalysts are preferably continuously maintained in the plumbic oxide state. This is most conveniently accomplished by the continuous injection of oxygen into the feed gas stream. In a regenerative-type process in which the dehydrodimerization is carried out in the substantial absence of free oxygen, these high-surface area catalysts are ineffective. We have made the surprising discovery that low-surface area catalysts are highly effective in the regenerative dehydrodimerization process. This is surprising since based on conventional methods employed in gas-phase reactions, one would expect the dehydrodimerization reaction to be more effective when carried out over a porous catalyst of high surface area. The exact opposite has been found to be true in the regenerative process.

When dehydrodimerizing propylene to biallyl, propylene is passed over a hot bed of lead oxide supported on an inert material. The reaction proceeds according to the equation:

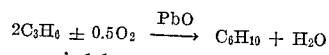

This is accompanied by an undesirable reaction yielding CO$_2$ and H$_2$O as follows:

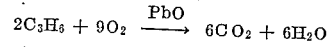

In the present process, free oxygen is not added as a reactant, sufficient oxygen being furnished from the oxygen content of the lead oxide to perform the desired oxidation. As a result of the reaction, PbO is reduced and the bed must be reoxidized. This is accomplished by passing a hot oxygen-containing gas over the catalyst bed according to the equation:

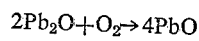

whereby the lead oxide catalyst is regenerated for reuse in the process.

The use of a lead oxide catalyst comprising lead oxide (PbO) supported on the surface of a carrier having a low surface area results in an unexpected and substantial increase in efficiency over the same type catalyst system using high surface area supports.

It has been found that the surface area of the support has a direct effect upon the efficiency and productivity of the catalyst. In general, supports of about 4 to 50 mesh size, preferably 12 to 20 mesh, having a low surface area, preferably having a specific surface area of about 1 m.$^2$/gram of support or less, are suitable for use in this invention. Alpha alumina, periclase, and fused aluminum oxide such as "Alundum" are examples of suitable materials. Of these, "Alundum" is preferred.

Prior catalysts made from alumina, such as those disclosed in S.N. 445,795, have relatively high porosity which may be as much as 65% with a large number of small pores averaging in diameter from about 2 to 30 microns. In our preferred embodiment, the number of pores is considerably reduced by use of a fused aluminum oxide support such as "Alundum" whereby the efficiency of the lead oxide catalyst is substantially increased and is effective at atmospheric and superatmospheric pressure to provide high productivity of product. Specifically, the catalyst permits sustained efficiency of over 70% with high product productivity. The catalyst has the further advantage of an unusually long life and can be economically produced for commercial use. While the exact reason for the advantages achieved by the catalyst of this invention are not known with certainty, it is suggested that the absence of pores in the catalyst is important to permit more rapid removal of reaction heat by free passage of gas over the catalyst. This is perhaps best evidenced by the fact that the catalyst has an unusually long life, indicating a further advantage that the catalyst substantially reduces the tendency to "hot spot" and destroy catalytic activity.

The catalyst of our invention may be prepared by any of several methods; for example, the procedure outlined in U.S. application S.N. 445,795. Alternatively, the support may be coated with a lead oxide slurry and dried at a suitable temperature. In a preferred embodiment, the catalytic oxide is formed on the support by precipitating a precursor on the support and then decomposing the metal to oxide. The lead oxide concentration on the catalyst support should be 17–50 weight percent, preferably 22–35 weight percent, based on the total weight of the supported catalyst.

The following two procedures outline preferred methods for preparing the supported catalyst of the invention. The catalyst support used in both procedures is 12–30 mesh fused aluminum oxide (Alundum) having a specific surface space less than 1 m.$^2$//gram of support:

Catalyst preparation—Method A (1) Make up 1.5 molar Pb(NO$_3$)$_2$ solution.
(2) Add sufficient amount of this solution to the support to give 0.85 to 1.0 gram of Pb(NO$_3$)$_2$ per gram of support.
(3) Evaporate to dryness over low heat (below 100° C.).
(4) Increase heat until evidence of Pb(NO$_3$)$_2$ decomposition is seen. This occurs at about 450–500° C. and is evidenced by reddish-brown fumes (NO$_2$). Continue heating at this temperature until no fumes are noted.
(5) When no further evidence of decomposition is seen, increase heat to give catalyst temperature of 650–700° C. (catalyst will be at red heat), hold for short time (about five minutes), then allow to cool.
(6) The resulting catalyst will contain about 17–50 wt. percent lead oxide; the percent lead oxide will vary depending on the amount of Pb(NO$_3$)$_2$ used and the amount of lead oxide that adheres to the support.

Catalyst preparation—Method B (1) Make up 1.5 molar Pb(NO$_3$)$_2$ solution.
(2) Pour this solution over support and allow to soak for five to fifteen minutes.
(3) Decant excess solution from the support.
(4) Heat the Pb(NO$_3$)$_2$ treated support until Pb(NO$_3$)$_2$ decomposition is evidenced by the giving off of reddish-brown NO$_2$ fumes.
(5) When no more NO$_2$ fumes are seen, heat the coated support to red heat (650–700° C.) for about five minutes, then allow to cool.
(6) When the treated support is cool, repeat steps 2–5 as many times as necessary to give a coating of about 17–50% lead oxide, based on total weight of the supported catalyst.

Example 1A.—(1) For comparative purposes, two supported lead oxide catalysts were prepared, one catalyst was made from 12–30 mesh activated alumina (350 m.$^2$/gram specific surface area), the other from 12–30 mesh Alundum (less than 1 m.$^2$/gram specific surface area). The two supported catalysts were prepared by soaking the supports in 1.5 molar lead nitrate solution, decanting the excess liquid and thermally decomposing the lead nitrate on the support to lead oxide as outlined in Method B above. By repeating this treatment five times, two catalysts were prepared having lead oxide deposited on the support to the extent of about 30 wt. percent PbO on the low surface area material and about 52 wt. percent PbO was on the high surface area material.

(2) Synthesis of biallyl was carried out in a cylically operated regenerative reactor shown in FIGURE 1 and described below employing the catalysts prepared above. In identical runs for each type of catalyst, propylene was passed over a catalyst bed of 220 cc. of catalyst in a single tube reactor of one inch stainless steel pipe. The temperature in the reactor was held at about 590° C. by placing the reactor inside a high temperature oven. Space velocity of propylene added was maintained at five minutes$^{-1}$. The reactor was operated on a synthesis cycle of six minutes followed by an air purge of six minutes for regenerating the catalyst. Gas chromatographic analysis of the reactor effluent showed 4.8% biallyl from the low surface area catalyst and 0.45 volume percent from high surface area catalyst. Efficiency of the reactions, i.e., yield based on propylene consumed, was 81% and 22%, respectively. During regeneration of the two catalysts, the low surface area catalyst used 97% of the oxygen supplied and returned to its original state of oxidation while the high surface area catalyst used only 50% of the oxygen supplied and did not return to its original state of oxidation.

The foregoing example clearly illustrates the advantages received when employing the highly selective dehydrodimerization catalyst of the instant invention.

(B) SYNTHESIS OF BIALLYL

The accompanying drawings further illustrate the novel process of this invention and will be described in detail below.

FIGURE 2 shows the effect of the preheating atmosphere on biallyl production.

FIGURE 4 shows the effect of the synthetic cycle length on biallyl production and on the amount of oxygen consumed.

The present process consists of the continuous synthesis of biallyl from propylene which is contacted in a cyclically operated regenerative reactor with a lead oxide catalyst, outlined in Section A hereof, comprising 17–50 weight percent PbO, preferably 22–35 weight percent, based on the total weight of the supported catalyst, supported on an inert carrier, preferably "Alundum" at temperatures from 320–700° C., preferably 550–650° C.

Figure 1:
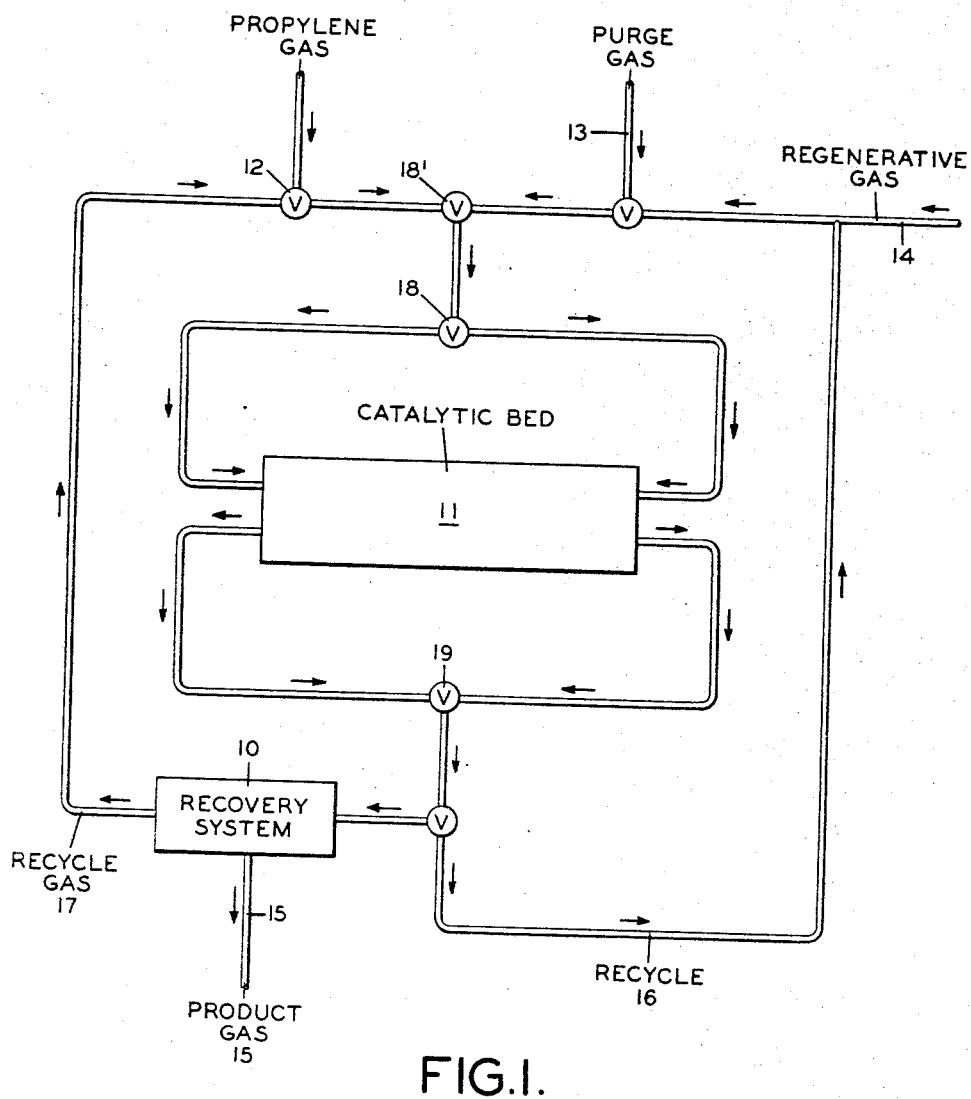
FIGURE 1 is a flow diagram of an arrangement for carrying out the process by way of example.

With reference to FIGURE 1, the lead oxide catalyst bed 11 is preheated by a hot oxygen-containing gas to 600 to 700° C. after which propylene, flowing countercurrent to the heating gas, at 0.1–50 p.s.i.a., preferably 14–18 p.s.i.a., and space velocity of 2.5–40 min.$^{-1}$, preferably 5–30 min.$^{-1}$, is fed through valve 12 and feed control valve 18 to the reactor from either end. The entrance point alternates each cycle. Propylene enters the reactor cold and is heated over the lead oxide catalyst bed. When reaction temperature is reached, some lead oxide will be reduced and biallyl, CO$_2$, H$_2$O and small amounts of other products are formed. The predominant reactions proceed as follows:

$$2C_3H_6 + .5O_2 \xrightarrow{PbO} C_6H_{10} + H_2O$$

$$2C_3H_6 + 9O_2 \xrightarrow{PbO} 6CO_2 + 6H_2O$$

$$PbO \longrightarrow Pb_2O$$

Product gases exit through valve 19 and are sent to a recovery system, designated 10, where biallyl may be recovered by any conventional means and discharged through line 15. Propylene is recycled for reuse to the synthetic stream through line 17. The synthetic cycle is followed by an inert separatory purge gas, such as steam, which enters through line 13 at about 600° C. for about 0.5 minutes, then by hot air or a mixture of air and combustion gases which enter through line 14 and exit at line 16, said air being indirectly heated to a temperature of about 500–800° C., preferably 625–725° C., at a space velocity of about 1–8 min.$^{-1}$, preferably 6–8 min.$^{-1}$ for reoxidizing and reheating the catalyst bed whereby the catalyst is restored according to the equation:

$$2Pb_2O + O_2 \rightarrow 4PbO$$

It appears that the reactions proceed according to the equations outlined above until about 60% of the PbO has been reduced to the suboxide, after which a competing consecutive reaction occurs that reduces the PbO still further to pure lead metal. When the oxide is reduced to lead metal, little biallyl is produced and cracking products and tars are primarily produced. Also catalyst cannot be regenerated without special treatment requiring removal of the catalyst from the reactor. Thus in accordance with the invention, the synthesis must be closely controlled so that the oxide is not reduced to lead.

The length of the synthesis cycle is therefore determined by this variable. Reduction of the lead oxide should be controlled so that 40 weight percent or more of the lead oxide remains as PbO and 60 weight percent or less of the original lead oxide is present as a suboxide or its equivalent, i.e., 30% oxygen or less consumed. As shown by FIGURE 4, reaction synthesis cycles of 2 to 8 minutes are employed, optimum results being received at about 6 minutes.

The reaction temperature is a second variable which should be carefully controlled. The lead oxide bed temperature decreases as propylene is heated and dimerized. This temperature should not decrease below 320° C. because below this temperature no biallyl is produced and propylene is largely unchanged. Above 700° C., undesired products such as tars and considerable pyrolysis products such as methane, ethane and hydrogen are formed.

Within the preferred operating range, the controlling variable is temperature, however synthesis should be stopped when either the temperature or limit of oxygen removal from PbO is reached.

Figure 3A:
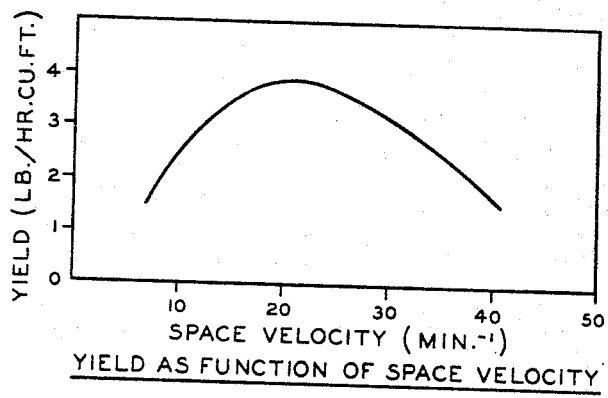
FIGURES 3A, 3B and 3C show the efficiency, yield and attack of propylene as a function of the space velocity.
Figure 3B:
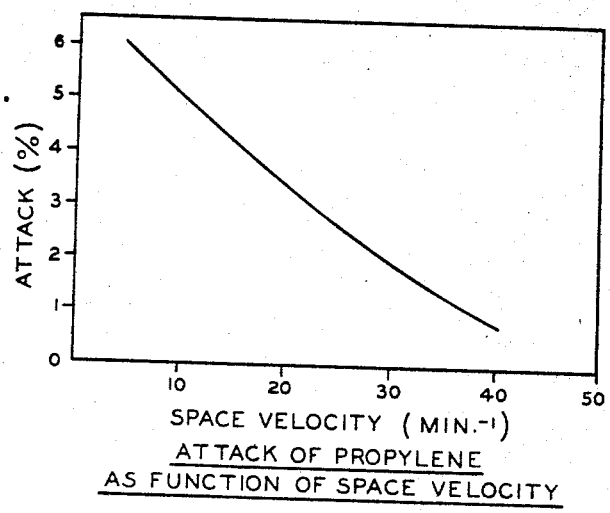
Figure 3C:
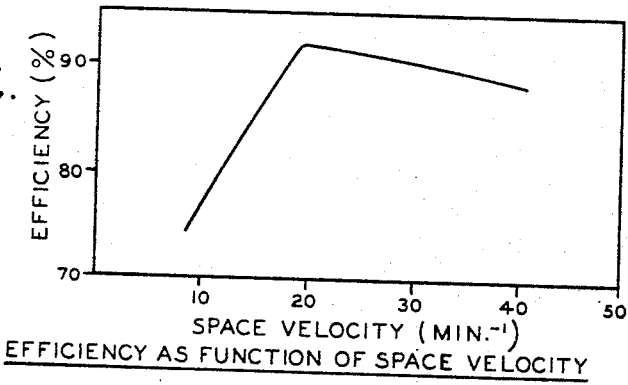

It is advantageous to preheat propylene to reaction temperature over the lead oxide catalyst bed rather than in empty pipe to eliminate pyrolytic reactions. See FIGURE 2. Additionally, the space velocity of propylene has a direct effect on the reaction efficiency, yield and catalyst attack and should be maintained within the range set forth above. See FIGURES 3A, B and C.

The following examples set forth the best method contemplated for carrying out the present invention, but they are not to be interpreted as limiting the scope of the invention to all details of the examples. Percentages are by volume and temperature in degrees centigrade unless otherwise specified.

Example 1B.—Biallyl synthesis was carried out by passing propylene at space velocity of 5 min.$^{-1}$ over lead oxide supported on 12–20 mesh abrasive grain "Alundum." (Lead oxide on "Alundum" was equivalent to 27 weight percent Pb based on total weight.) Reaction was carried out at a temperature of 575° C., 18 p.s.i.a. pressure and 12-minute synthesis-regeneration cycles. The propylene fed to the reactor was preheated to about reaction temperature over lead oxide. The reactor was a 6-inch section of ¾-inch diameter stainless steel pipe enclosed by a double wall of oven firebrick. Temperature measurements were made by installing thermocouples enclosed in thermowells fabricated from ¼-inch stainless steel tubing at each end of the lead oxide bed and recorded by an automatic recording strip chart recorder. Gas chromatographic analysis of the reactor effluent showed 4.8 vol. percent biallyl and 6% $CO_2$. Other products were $H_2O$ and small amounts of an unidentified product. Propylene consumed, based on biallyl and $CO_2$ production, was 11.6% and the yield based on propylene consumed was 83%. Reaction cycle was operated for 6 minutes. Regeneration was effected by stopping the propylene flow and introducing air to the reactor for 6 minutes at 40 min.$^{-1}$ space velocity. Both electrically operated solenoid valves and manually operated flip-flop valves were used successfully for introduction of the air and propylene gas to the reactor in proper sequence.

Example 2B.—A series of tests were conducted in the manner of Example 1 with a somewhat less active catalyst containing about 20 weight percent Pb based on total weight using 2, 4, 6 and 8-minute synthesis cycle times. Biallyl in the exit gas was 2.65, 2.65, 2.65 and 2.25 volume percent, respectively, as shown in curve A of FIGURE 4. Analysis of residual catalyst and comparison with production data show decreased catalyst activity and less biallyl in the exit gas after 20% of the total oxygen on the catalyst had been consumed and that optimum results were obtained after about 6 minutes as shown by curve B of FIGURE 4.

Example 3B.—Tests conducted in the manner of Example 1 but with relatively long production cycles indicate that once the catalyst becomes inactive through over reduction, it cannot be regenerated without special treatment involving removal from the reactor. An attempt was made to regenerate the lead oxide bed after biallyl concentration in the exit gas dropped from 3.5 to 0.7 volume percent. Regeneration was carried out by passing air for 6 minutes, then pure oxygen for 30 minutes over the bed. When a production cycle was then run, biallyl concentration in the exit gas after oxygen passed over the bed was only 0.38%. When the catalyst was removed from the reactor, it was observed that much of the oxide had been reduced to pure lead.

The foregoing examples illustrate the effect of the extent of reduction of PbO on the present process.

Example 4B.—Biallyl synthesis was conducted at preferred conditions in a reactor similar to that described in Example 1 except that propylene was preheated in an empty pipe. Gas chromatographic analysis of the reactor effluent showed 3.5 volume percent biallyl and 4.5 volume percent $CO_2$ along with small amounts of $H_2O$ and an unidentified product. As a result of preheating in an empty pipe, pyrolitic reactions deposited sufficient carbon on the lead oxide face to give $CO_2$ analysis of from 5 to 12% in the gas effluent during the regeneration cycle, thus reducing the overall reaction efficiency to as low as 25% and effecting relatively rapid reduction of the lead oxide to lead.

Example 5B.—Extended tests were performed over a large number of synthesis-regeneration cycles in the manner of Example 1 except that in one test the propylene was preheated over lead oxide and in the other test preheated in an empty pipe. As shown in FIGURE 2, the lead oxide activity dropped sharply after about 2 hours when propylene was preheated in an empty pipe. Examination of the bed after shutdown revealed carbon deposits resulting from pyrolytic reactions in the free space above the lead oxide bed. Heat from the partial burning of the carbon during regeneration caused high temperature surges. Also part of the oxide catalyst was reduced to pure lead because of reaction inefficiency thus destroying the activity of the bed. When feed propylene was preheated over lead oxide, no evidence of pyrolitic reaction was found and the lead oxide catalyst was not reduced to lead.

The foregoing examples illustrate the distinct advantages received by preheating propylene over the lead oxide catalyst.

Example 6B.—Tests were conducted under conditions similar to Example 1 except that the space velocity was varied from 5 to 40 min.$^{-1}$. With increased space velocity, the propylene attack decreased, the biallyl yield and reaction efficiency increased to a maximum at 20 min.$^{-1}$ space velocity and decreased thereafter. Data are plotted in FIGURES 3A, B and C.

The foregoing example illustrates the effect of space velocity on the efficiency, attack and yield of the process.

We claim:
1. A cyclic process for dehydrodimerizing propylene to biallyl which comprises (1) contacting propylene, in the essential absence of molecular oxygen, with a catalyst comprising about 17 to 50 weight percent PbO supported on the surface of a solid, inert carrier having a surface area of no greater than about 1 m.$^2$/gram at a temperature of about 320 to about 700° C. until no more than 30% of the oxygen present in the PbO is consumed; (2) recovering the biallyl thus produced from the product gases; and (3) heating the catalyst with a molecular oxygen-containing gas to a temperature of 500–800° C. subsequent to step (1) to regenerate the PbO.

2. The process of claim 1 wherein propylene is added at a space velocity of 2.5 to 40 min.$^{-1}$ and the reaction pressure is from 0.1 to 50 p.s.i.a.

3. The process of claim 1 wherein said inert carrier is fused aluminum oxide.

4. The process of claim 1 wherein propylene is preheated over a part of the catalyst bed to a temperature of 600 to 700° C.

5. The process of claim 1 wherein said catalyst comprises 12–20 mesh fused aluminum oxide having supported on its surface 22 to 35 weight percent as PbO based on the total weight of the supported catalyst.

6. The process of claim 1 wherein said reaction is conducted until 20% or less of the oxygen present in the PbO is consumed.

7. The process of claim 1 wherein said oxygen-containing gas is air.

8. The process of claim 1 wherein the reaction temperature is 550–650° C.

9. The process of claim 1 conducted in a synthesis-regeneration cycle of 12 minutes.

10. A cyclic process for dehydrodimerizing propylene to biallyl which comprises (1) contacting propylene, in the essential absence of molecular oxygen, at a space velocity of 5–30 min.$^{-1}$ and pressure of 14–18 p.s.i.a. with a catalyst comprising about 22 to 35 weight percent PbO supported on the surface of fused aluminum oxide having a surface area no greater than about 1 m.$^2$/gram, the propylene having been preheated over the lead oxide catalyst to a temperature of about 600–700° C.; (2) maintaining the reaction temperature at 550–650° C. until 20% or less of the oxygen present in the PbO catalyst is consumed; (3) recovering unreacted propylene; (4) recovering biallyl thus produced from the product gases; (5) heating the catalyst with preheated air to a temperature of 625 to 725° C. subsequent to step (2) to regenerate the PbO; and (6) employing a synthesis-regeneration cycle of 12 minutes.

11. A dehydrodimerization catalyst which comprises from 22 to 35 weight percent of PbO, based on the total weight of the catalyst, supported on the surface of 12–20 mesh fused aluminum oxide having a surface area no greater than 1 m.$^2$/gram.

References Cited

UNITED STATES PATENTS

| | | | |
|---|---|---|---|
| 2,369,558 | 2/1945 | Gilbert | 252—463 X |
| 2,627,527 | 2/1953 | Connolly et al. | 260—604 |
| 2,818,441 | 12/1957 | Vaughan et al. | 260—680 X |
| 3,184,415 | 5/1965 | Huntley et al. | 252—463 X |

PAUL M. COUGHLAN, JR., *Primary Examiner.*

U.S. Cl. X.R.

252—463